United States Patent
Milde, Jr.

(10) Patent No.: US 6,179,247 B1
(45) Date of Patent: Jan. 30, 2001

(54) PERSONAL AIR TRANSPORT

(76) Inventor: Karl F. Milde, Jr., 752 Union Valley Rd., Mahopac, NY (US) 10541

( * ) Notice: Under 35 U.S.C. 154(b), the term of this patent shall be extended for 0 days.

(21) Appl. No.: 09/352,522

(22) Filed: Jul. 13, 1999

Related U.S. Application Data

(63) Continuation-in-part of application No. 09/247,163, filed on Feb. 9, 1999.

(51) Int. Cl.[7] .......................... B64C 15/00; B64C 29/00; F02B 73/00
(52) U.S. Cl. .................. 244/23 A; 244/23 C; 60/716
(58) Field of Search .................. 244/12.2, 23 A, 244/23 C; 60/716, 717, 718

(56) References Cited

U.S. PATENT DOCUMENTS

| D. 292,194 | 10/1987 | Moller ............................. D12/5 |
| D. 312,068 | 11/1990 | Moller ........................... D12/326 |
| 2,282,612 | * 5/1942 | Schultz ........................ 60/716 X |
| 3,082,977 | * 3/1963 | Arlin ............................ 244/17.23 |
| 3,599,901 | 8/1971 | Relkin ........................... 244/12 B |
| 3,614,030 | 10/1971 | Moller ............................ 244/23 C |
| 3,640,489 | * 2/1972 | Jaeger ........................... 244/23 C |
| 3,863,869 | 2/1975 | Bachman ....................... 244/23 D |
| 3,933,325 | * 1/1976 | Kaelin ............................ 244/23 C |
| 4,071,207 | 1/1978 | Piasecki et al. ................ 244/23 D |
| 4,202,518 | 5/1980 | Burnham et al. ................ 244/12.1 |
| 4,230,292 | 10/1980 | Van Nimwegen ............... 244/23 D |
| 4,457,476 | 7/1984 | Andresevitz .................... 244/23 C |
| 4,795,111 | 1/1989 | Moller ............................ 244/23 C |
| 5,115,996 | 5/1992 | Moller ........................... 244/12.5 |
| 5,213,284 | 5/1993 | Webster ......................... 244/23 C |
| 5,239,830 | * 8/1993 | Banthin et al. .................. 60/718 |
| 5,653,404 | 8/1997 | Ploshkin ........................ 244/12.2 |
| 5,881,970 | 3/1999 | Whitesides ..................... 244/23 C |

* cited by examiner

Primary Examiner—Robert P. Swiatek
(74) Attorney, Agent, or Firm—Milde, Hoffberg & Macklin, LLP

(57) ABSTRACT

A wingless personal air transport (PAT) comprises two main sections: First, a substantially horizontal circular inner platform is provided with its outer extremity having a first diameter D1. This inner platform has a seat for carrying at least one person and a shroud forming a smooth upper surface extending outward and downward to its outer extremity. Second, a substantially horizontal annular outer platform is arranged coaxially with the inner platform. This outer platform has a central opening with a second diameter D2 and a shroud forming a substantially smooth upper surface extending inward and downward into its central opening. The second diameter D2 is greater than said first diameter D1. Preferably there are at least five thrusters arranged in the space between the inner and outer platforms to provide a downward thrust of air. Also preferably, a clear plastic hemispherical bubble is arranged on top of the inner platform to protect the passengers and provide for the smooth flow of air.

37 Claims, 12 Drawing Sheets

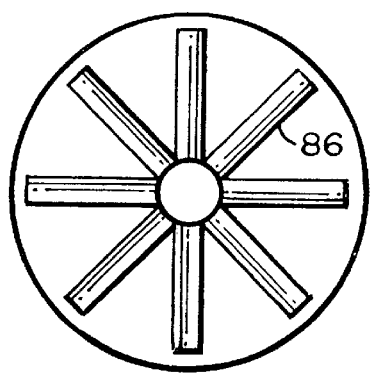
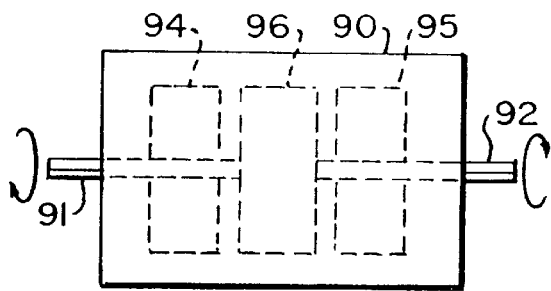
FIG.16               FIG.17
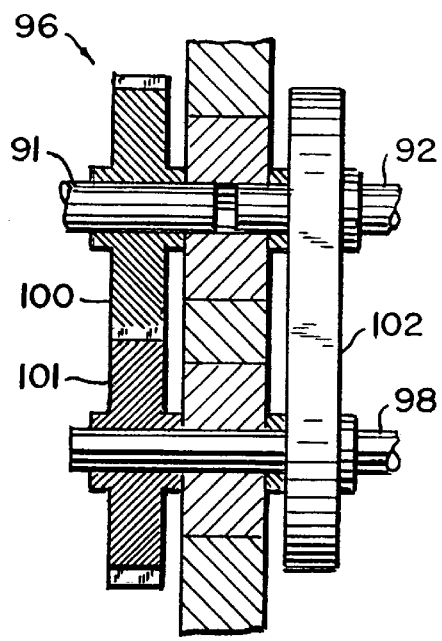
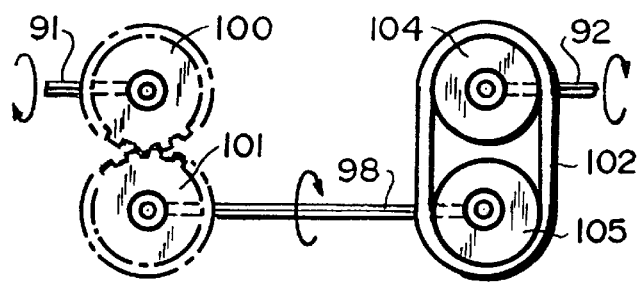
FIG.18               FIG.19
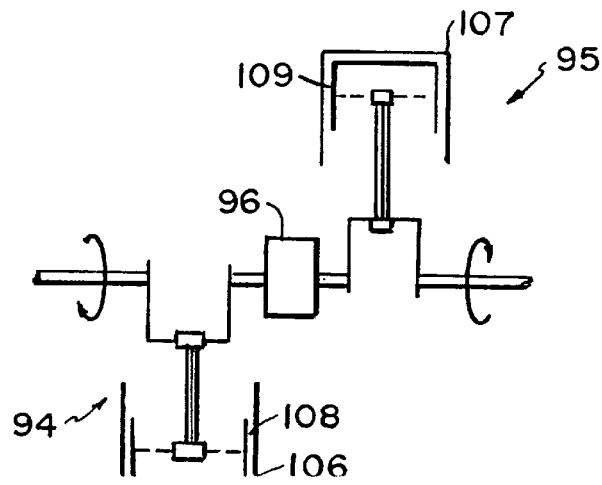
FIG.20

PERSONAL AIR TRANSPORT

CROSS-REFERENCE TO RELATED APPLICATION

This application is a continuation-in-part of U.S. patent application Ser. No. 09/247,163, filed Feb. 9, 1999 for "PERSONAL AIR TRANSPORT".

BACKGROUND OF THE INVENTION

The present invention relates to a personal air transport or "PAT" which is capable of taking off and landing vertically as well as hovering, if desired. The PAT can maneuver, forward and back as well as side to side, and is capable of traveling forward at a reasonable speed.

Small vertical take-off and landing (VTOL) aircraft have been constructed in various configurations. The most well known is the helicopter which operates with powered rotor blades arranged above the craft body that rotate about a substantially vertical axis, and a powered tail rotor that rotates about a substantially horizontal axis. The pitch of the tail rotor blades is controlled in the cockpit by two pedals—one for the right foot and one for the left—which permit the operator to rotate the craft about the vertical axis or to hold it in a fixed, stable orientation by pressing on the right or left pedal, as desired. The pitch of the upper rotor blades is controlled by two levers: an up-down lever which changes the pitch if all blades at once and a directional "joystick" that selectively changes the pitch of the blades as they rotate through a 360° arc. The joystick is used to tilt the craft and thus impart lateral motion.

Another craft which is capable of VTOL utilizes shrouded rotor blades for extra lift. Instead of arranging the lifting blades in open air, as in the case of a helicopter, they are placed in a vertical "wind tunnel". As air is drawn in, it passes over a smooth upper rim of the tunnel, reducing the air pressure on this rim in accordance with Bernoulli's Principal. Such a shroud thus not only prevents the air from exiting outward, horizontally from the rotor blades, it also adds lift by this application of Bernoulli's Principal, thereby adding a multiple of about 1.5 to the static thrust as compared to an unshrouded set of rotor blades.

VTOL craft which utilize shrouded rotor blades are therefore considerably more efficient and require less energy to remain airborne. Aircraft of this type are known from the U.S. Pat. Nos. 3,614,030; DES 292,194; 5,213,284 and 5,881,970.

For one reason or another, none of these aircraft designs has risen to the level of commercial practicality.

SUMMARY OF THE INVENTION

It is a principal object of the present invention to provide a personal air transport ("PAT") which is capable of vertical take-off and landing (VTOL) and which is exceedingly safe to fly, notwithstanding engine failure.

It is a further object of the present invention to provide a PAT, capable of VTOL, which is exceedingly simple and easy to control and easy to operate.

It is a further object of the present invention to provide a PAT, capable of VTOL, which requires a minimum of energy to remain airborne.

These objects, as well as other object which will become apparent from the discussion that follows, are achieved, in accordance with the present invention, by providing a stable, shrouded platform with a plurality N of engines distributed around a circle substantially equidistant from each other, with each engine arranged to provide upward thrust along a substantially vertical axis. If the number N of engines is made greater than or equal to five, the PAT can retain its stable orientation in space and continue to fly even in the event of an engine failure.

Preferably, the number N is made equal to at least 10. In the preferred embodiment of the present invention, disclosed herein, where the craft is about 10 feet wide, N=13.

The present invention takes advantage of the fact that small yet powerful internal combustion (IC) engines, as well as jet engines, are available commercially. The power-to-weight ratio of such engines is comparable to that of larger air-cooled IC engines used for full sized aircraft.

Because of its reduced noise and reduced exhaust pollutants as compared to a two-cycle engine, it is advantageous to select a four-cycle IC engine. The somewhat lower power to weight ratio of this engine is offset by the greater torque that is available at lower RPM.

Also, for reasons of balance and reduced vibration, it is advantageous to select a twin cylinder reciprocating engine with opposed pistons or possibly even a Wankel engine. The two cylinder IC engine has the additional advantage, over a single cylinder engine, that it will continue to operate, even though one of the two cylinders may temporarily cease producing power.

Finally, it is advantageous to select a glow plug engine over a spark plug ignited engine because a spark plug ignition system is considerably more complex and prone to failure as compared to a glow plug.

In a preferred embodiment of the present invention the engine drives a propeller having a diameter in the range of 12–20 inches. This dictates that the engine should have a cubic inch displacement in the range of 1.0 to 3.0.

Preferably a muffler system is provided to substantially muffle the noise of the various engines. Such a system may include a single large muffling "ring" which surrounds the PAT and receives the exhaust from all engines.

As a particular example, the PAT may be powered by thirteen one or two-cylinder, four cycle engines available commercially from Echo Inc., 400 Oakwood Road, Lake Zurich, Ill. 60047. Such an engine may deliver over 50 pounds of static thrust when outfitted with a multiple blade, 20 inch propeller with a 6 inch pitch.

At full power, ten of these engines can lift over 500 pounds without a shroud. In a shrouded configuration ten such engines can lift about 1.5 times this weight or 750 pounds.

Assuming a craft weight of 225 pounds and a full tank (20 gallons) of fuel weighing 125 pounds, the craft will be able to lift a payload of about 400 pounds.

Add three more engines and thirty percent more power, and the craft becomes a nimble flyer which can rapidly rise off the ground and fly horizontally in any desired direction.

Control of the PAT is effected in two ways:

(1) Small moveable paddles which enable the craft to rotate about its central vertical axis under control of the operator, and (2) Individual throttle control of each engine, thus controlling the engine speeds.

All of the engine speeds are controlled as a single group to cause the craft to rise, fall or hover. The speed of each engine is also controlled separately in a manner to be described hereinbelow to cause the craft to tilt in any desired direction and thus to move horizontally.

Preferably, the engine throttles are controlled by servomotors which, in turn, are controlled electronically. A first throttle lever is used by the operator to increase or decrease the speeds of all engines at once. A joystick is used to control the relative speeds of the engines and thus the tilt of the craft.

As in the case of a conventional helicopter, pedals are provided to enable the operator to rotate the craft. These pedals mechanically actuate two "paddles" or flaps arranged beneath the engines on opposite sides of the craft, in the downwash of the driven air, to rotate the craft about its vertical axis.

The PAT according to the invention is preferably configured as follows:

A substantially horizontal circular inner platform is arranged at the center of the craft to carry the craft passengers. The inner platform carries a seat for at least one person and has a preferably transparent, hemispherical enclosure arranged as a "bubble" over the passenger seat for protecting the passengers of the craft and providing a smooth surface for the flow of air. The enclosure extends downward to the circular outer extremity of the inner platform which has a diameter D1.

A substantially horizontal annular outer platform is arranged coaxially and surrounds the inner platform. The outer platform has a central opening with a second diameter D2, this second diameter being greater than the first diameter. The annular outer platform has a shroud forming a substantially smooth upper surface extending inward and downward into the space between the inner platform and outer platform.

At least one thruster is arranged in the space between the inner and outer platforms for forcing air downward to lift and propel the craft. Such a thruster may comprise a single engine, centrally arranged on the inner platform, for driving fan blades disposed in the space between the inner and outer platforms which rotate about the central vertical axis of the craft. Alternatively, the thrusters may comprise a plurality of engines arranged in the space between the inner and outer platforms, such as internal combustion reciprocating engines, internal combustion Wankel engines or even jet engines.

In the preferred embodiment of the invention, the engines are started one-by-one by a single electric motor which moves in a circle and engages the spinner or hub of each respective engine. As each engine is rotated to start it, electric power is applied to the engine glow plug or spark plug. Once the engine has started, both the mechanical power of the starter is removed and thereafter applied to the next engine in succession.

For movement on land, the PAT is preferably outfitted with casters, allowing the craft to be rolled by hand into a garage or the like.

The PAT is also provided with a flexible dust skirt, enabling it to hover on sand or water, if desired. This skirt collapses when the engines are switched off, allowing the craft to lower itself onto the casters.

In a preferred embodiment, telescoping "stilts" are provided to absorb the landing shock. These stilts are retracted when the craft is flying and while the craft is being rolled on its casters.

For stability, it is advantageous to have the center of gravity of the passengers (and luggage) disposed gravitationally below the level at which the engines lift the craft. Also, in addition to, or instead of, the system for selectively varying the speeds of the engines, thereby to tilt the craft and cause it to move in the horizontal direction, it is advantageous to provide means by which the passenger(s) can shift their weight laterally. This causes the craft to tilt as well, and thus to move horizontally.

Finally, if desired, the passenger seat(s) can be made to pivot forward and backward so that the passenger(s) can remain substantially level, even though the PAT craft may tilt forward (for traveling forward) or backward (for traveling backward).

These and other features and advantages will become apparent from the discussion that follows when taken in conjunction with the accompanying drawings.

BRIEF DESCRIPTION OF THE DRAWINGS

FIG. 16 is a top view showing the propeller blades of the thruster of FIG. 15.

FIG. 17 is a representational diagram of an engine or prime mover which rotates two coaxial shafts in opposite directions.

FIG. 18 is a detailed diagram of a mechanism used in the engine of FIG. 17 for connecting the oppositely rotating shafts.

FIG. 19 is a representational diagram illustrating the operation of the mechanism of FIG. 18.

FIG. 20 is a representational diagram of a reciprocating engine of the type shown in FIG. 17.

DETAILED DESCRIPTION OF THE PREFERRED EMBODIMENTS

Figure 1:
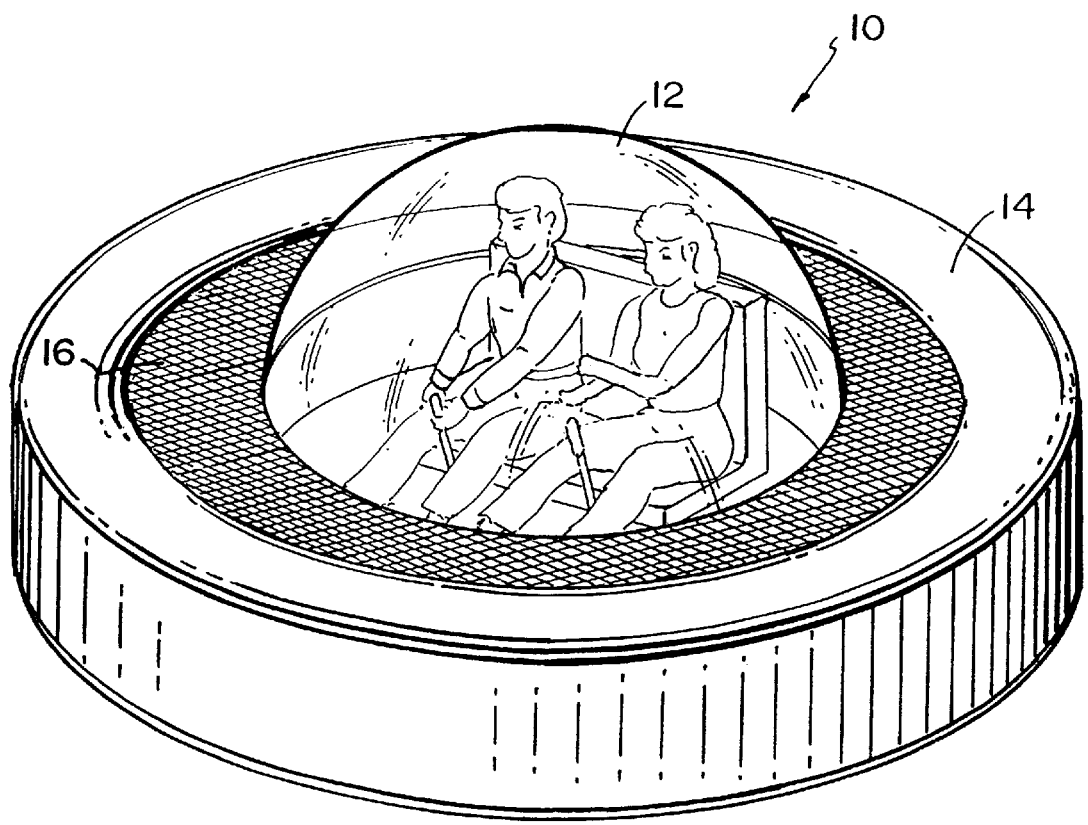
FIG. 1 is a perspective view of the personal air transport (PAT) according to a preferred embodiment of the present invention.

The preferred embodiments of the personal air transport (PAT) will now be described with reference to FIGS. 1–27 of the drawings. Identical or similar elements in the various figures are identified with the same reference numerals.

FIG. 1 is an illustration of the PAT 10 in flight. The craft comprises a circular inner platform 12 having a clear plastic bubble in the shape of a hemisphere. The inner platform supports two passenger/operators 29 and 30 on seats 22 within the bubble as well as the controls, indicated by the joystick 24. The bubble is provided with a door (not shown) for the passengers.

Surrounding and connected to the inner platform 12 is an annular outer platform 14. Like the inner platform, the outer platform has a smooth, rounded upper surface extending inward and downward toward the annular region 16 between the two platforms. As indicated in FIG. 1, this region is covered by a protective screen but air is drawn downward into the space by engines 18 and propellers 20 (FIG. 2) and exhausted out the bottom. Each engine may drive a single, mutliblade propeller, or may drive two propellers, as shown, one above and one below the engine, in the same direction of rotation. As the air passes over the upper surfaces of the inner and outer platforms it reduces the pressure on these surfaces, in accordance with Bernoulli's Principal, increasing the lift or upward thrust produced by the engines. This increased lift, coupled with the effect of the shrouds surrounding the propellers which prevent air from exiting in any direction except downward, adds a factor of about 1.5 to the upward thrust as compared to an engine and propeller situated in free space. Thus, if an engine 18 and its associated propeller(s) can produce an upward thrust of 50 pounds in free space, each engine in the PAT will generate about 75 pounds of lift.

Figure 2:
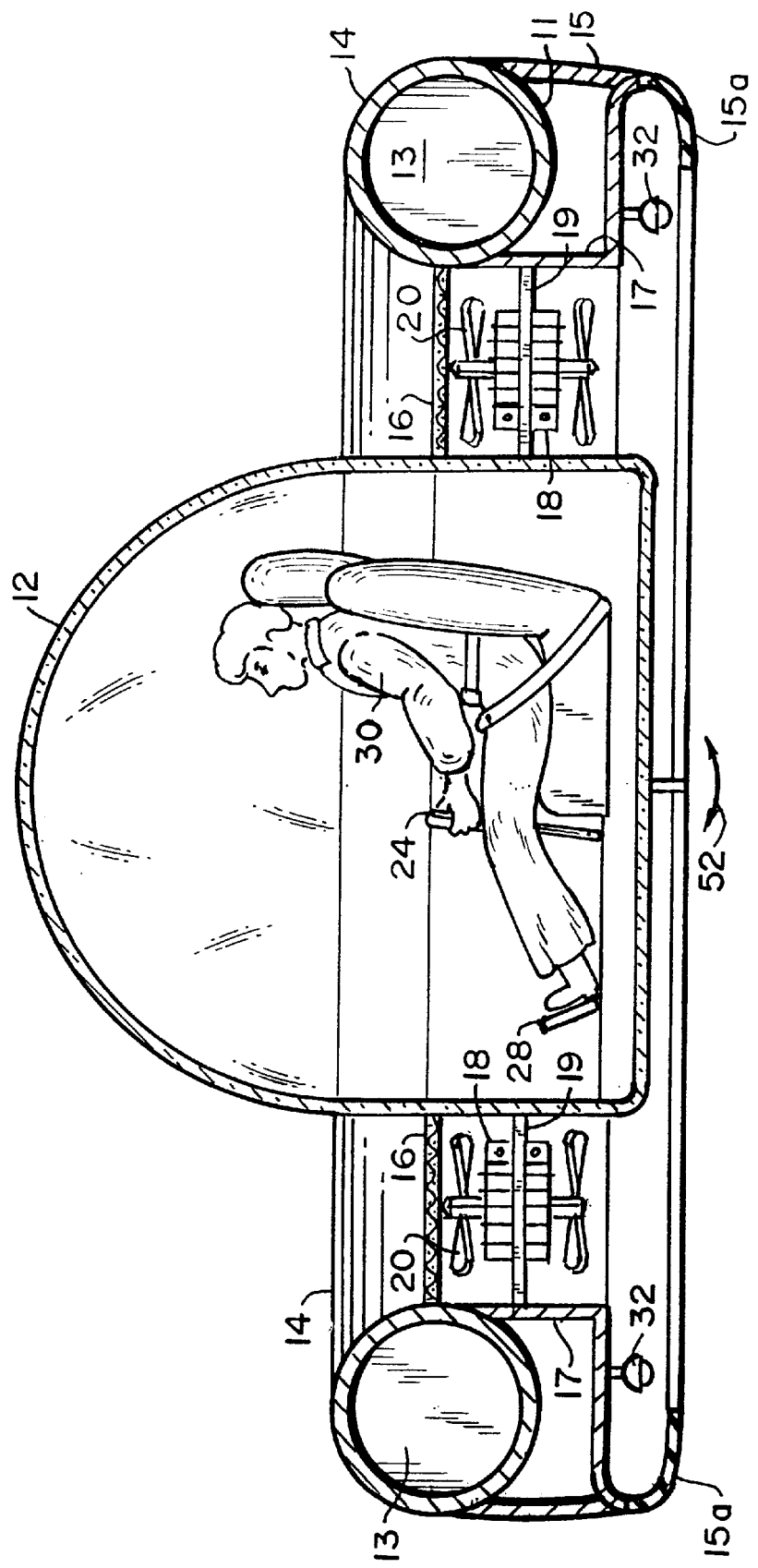
FIG. 2 is a cross-sectional view of the PAT of FIG. 1 showing the relative positions of the major components.
Figure 3:
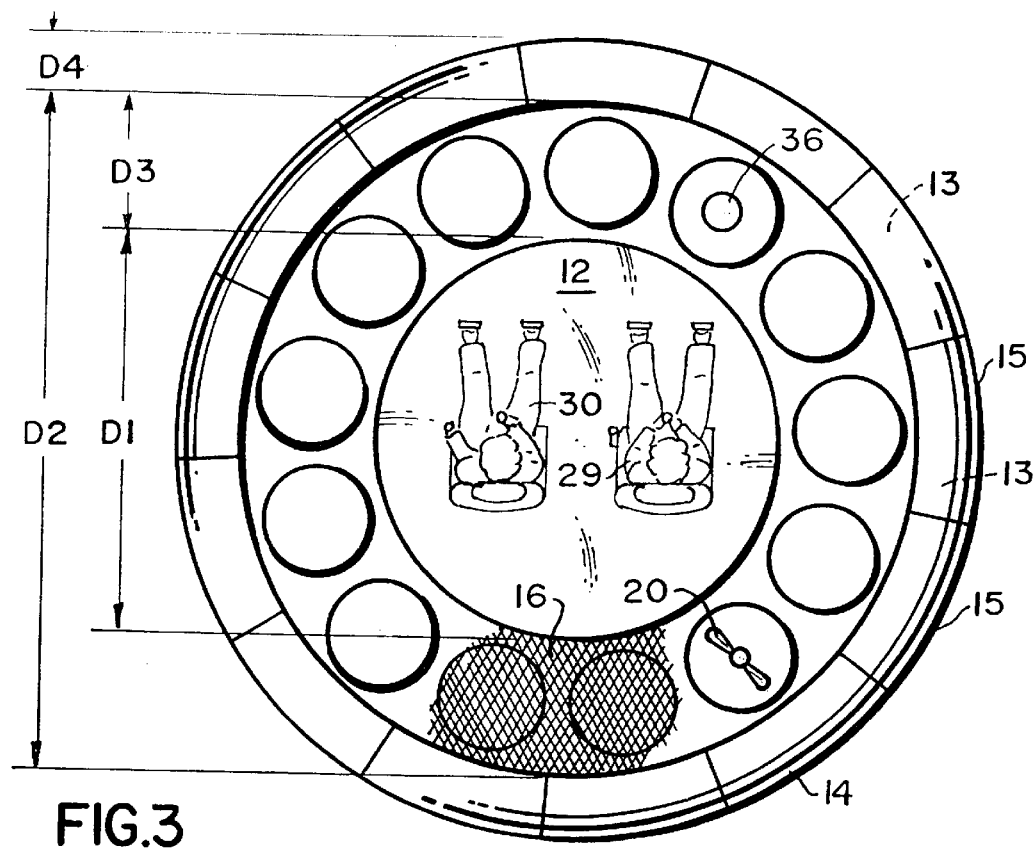
FIG. 3 is a top view of the PAT of FIG. 1.

Referring to FIGS. 2 and 3, it may be seen that the outer platform 14 comprises an upper annulus 11 which encloses a plurality of fuel tanks 13 (e.g., thirteen, one per engine) arranged symmetrically about the circle, an outer shroud 15 and an inner shroud 17. These shrouds as well as a dust-catching skirt 19, are configured to prevent the air forced downward by the propellers 20 from recycling upward and entering the driven airstream again.

The outer platform 14 also includes an exhaust muffling system (not shown) for the engines, whereby all engine exhaust is supplied to a single muffler and then released downward into free space.

Referring to FIG. 3, there are shown the two passengers 29 and 30 sitting in the center of the craft on the inner platform. Thirteen engines and propellers 20 surround the inner platform and these, in turn, are surrounded by the outer platform 14.

In the upper right quadrant of the diagram there is indicated an electric starter motor 36. More will be said about this starter motor in connection with FIG. 10.

Figure 4:
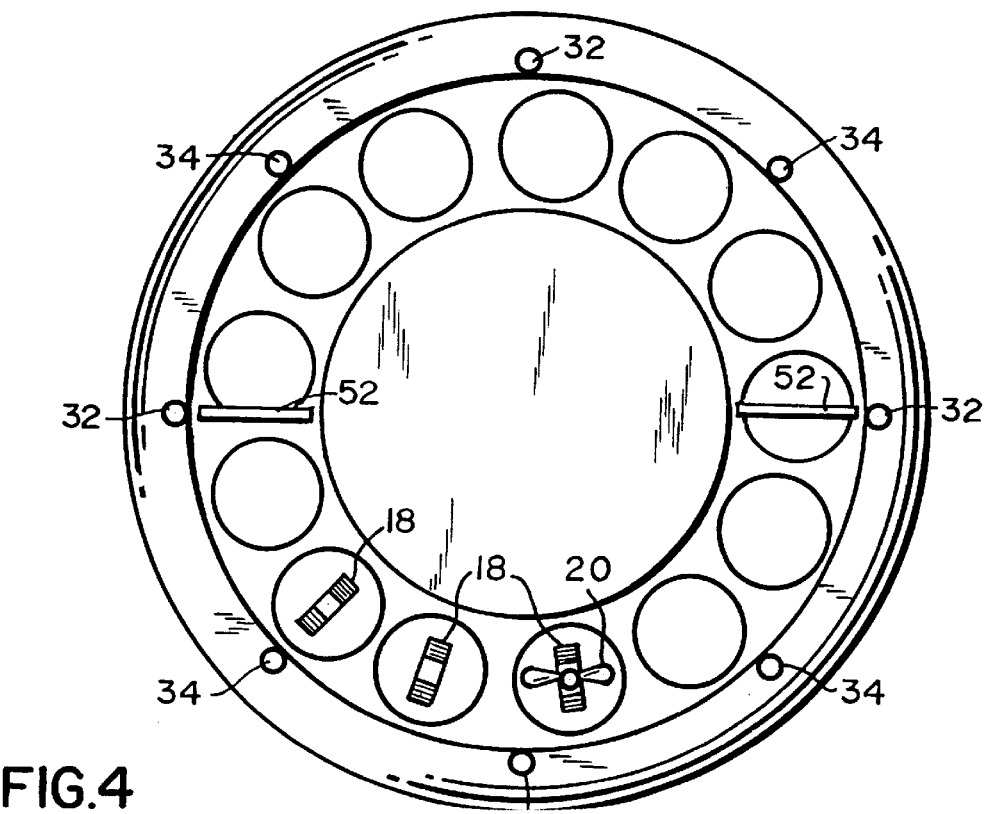
FIG. 4 is a bottom view of the PAT of FIG. 1.

FIG. 4 shows the reverse (bottom) side of the PAT. As may be seen, the engines 18 are opposed two cylinder engines, preferably four-cycle in operation. Surrounding the engines and attached to the outer platform are four casters 32 interspersed by four landing "stilts" (shock absorbers) 34. More will be said about these landing stilts (LS) in connection with FIG. 8.

FIGS. 3 and 4 illustrate the respective size (diameters) of the inner and outer platforms. The inner platform has an outer diameter D1 whereas the outer platform has an inner diameter D2>D1. The difference D2 minus D1 or D3 is slightly greater than the diameter of the propeller 20.

In the preferred embodiment of the invention, illustrated in FIGS. 1–4, the outer diameter D1 is 6 feet, the inner diameter D2 is between 8 and 9 feet and the overall diameter D4 is 10 feet. The space D3 for the propellers is therefore approximately in the range of 1 and 1.5 feet. The Echo twin-cylinder reciprocating engine, referred to above, may operate with 16 to 20 inch propeller(s) having a six inch pitch.

Figure 5:
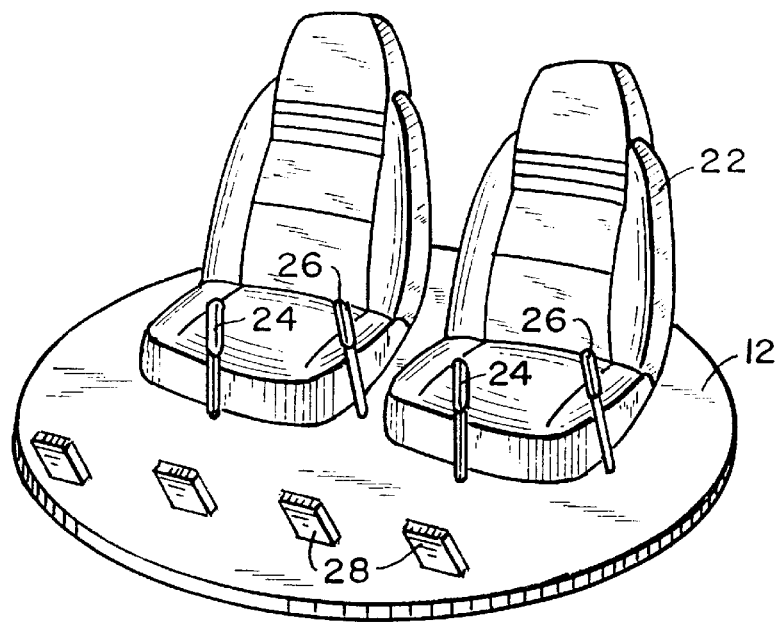
FIG. 5 is a detailed view of the cockpit of the PAT of FIG. 1.

FIG. 5 illustrates the cockpit controls for the craft. Joystick 24 is used in its conventional way to orient the craft front to back and side to side. This control adjusts the relative speeds of the engines to cause the craft to tilt. For example, pushing the joystick forward causes the rearward engines of the craft to increase in speed and (if desired) the front engines to decrease their speed slightly, thereby increasing the relative lift in the back and causing the craft to tilt forward. This forward tilt results in the craft moving forward in the horizontal direction.

The control arms 26 are throttle controls which operate all engines simultaneously and in unison. If this arm or lever is pulled upward, the engines speed up, causing the craft to rise. If this lever is pushed down, the craft will sink. At one particular setting of the lever 26 the craft will hover.

The joystick 24 and lever 26 operate variable resistors in an electrical circuit that produces the proper pulse code modulated (PCM) signals for the engine throttle servos. Each engine is controlled by its own individual servo which rotates the throttle spindle of the engine. The electronic circuit for this function will be explained in connection with FIG. 12.

Figure 11:
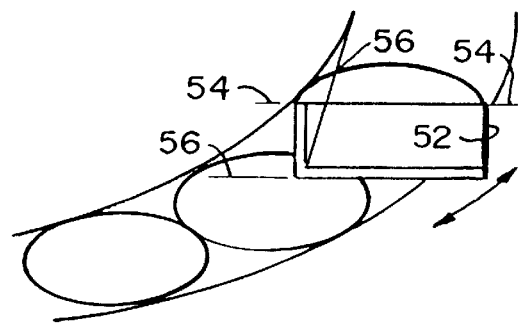
FIG. 11 is a detailed diagram of a craft rotator flap or "paddle", used for rotating the PAT about its central vertical axis.

Pedals 28 operate flaps or "paddles" on opposite sides of the craft, as shown in FIGS. 2, 4 and 11. These flaps move in opposite directions in the airstream to rotate the craft. The rotator flaps 52 are pivoted about an axis 54 and are operated by cables 56 mechanically connected to the pedals 28. Pressing the right pedal causes the craft to rotate clockwise; pressing the left pedal causes it to rotate counter-clockwise.

Figure 6:
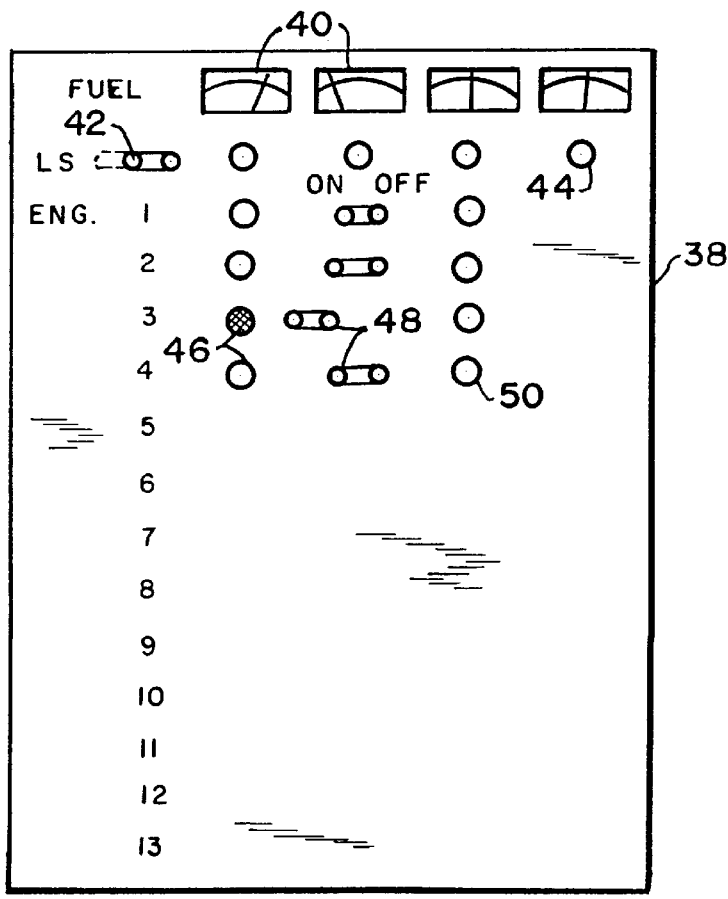
FIG. 6 is a detailed view of a portion of the control panel of the PAT of FIG. 1.

FIG. 6 shows a portion of the instrument panel 38 relating to engine control and operation. The usual navigation instruments (gyro and magnetic compass) have been omitted for reasons of clarity.

The top row of gauges 40 shows the fuel level in four separate tanks: front, rear, left side and right side. While there may be more fuel tanks (e.g., one per engine as noted above) it is assumed that the fuel levels in four tanks around the periphery of the craft are representative of the fuel levels in all tanks.

The next line, marked "LS", relates to the landing stilts of the craft. This landing gear will be described in detail in connection with FIG. 8. At the left, on this line, is a single switch 42 for raising and lowering all landing stilts as a group. To the right of the switch are four lights 44 which indicate whether each respective landing stilt is in the extended (landing) position.

If all four lights are not illuminated upon landing when the switch 42 is placed in the "gear down" position, the operator may retract the gear and land the craft directly on the casters 32.

The remaining rows on the instrument panel are numbered 1, 2, 3 . . . 12, 13. These numbers specify an engine number on the craft. For each engine there is provided a starter button 46 for the starter motor, an on/off switch 48 for the engine ignition or glow plug(s) and an over-heat temperature light 50. These controls enable the operator to start each respective engine and to monitor it during flight. Engines are switched off by moving the throttle lever 26 to the "off" position, thereby preventing both fuel and air from entering the engines.

Figure 7:
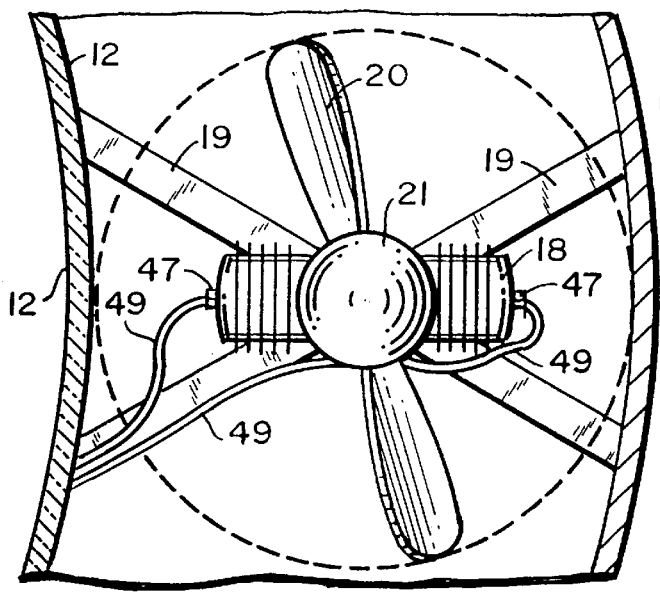
FIG. 7 is a detailed view of an engine of the PAT of FIG. 1.

FIG. 7 is an illustration of a single engine 18 and its associated propeller 20 and spinner hub 21. In this case the engine is a twin piston and cylinder type internal combustion engine. The opposed cylinders are outfitted with glow plugs 47. A suitable voltage (e.g. 1.5 volts) is selectively applied to the glow plugs, via the control panel switch 48 discussed above, through wires 49 which are permanently connected to the plugs. The engine 18 is attached to the craft 12, 14 by means of bracket members 19. An "X" configuration of these brackets is shown, but any suitably robust arrangement will suffice. Engine exhaust is ported to the exhaust muffler system (not shown) in the outer platform 14.

Figure 8:
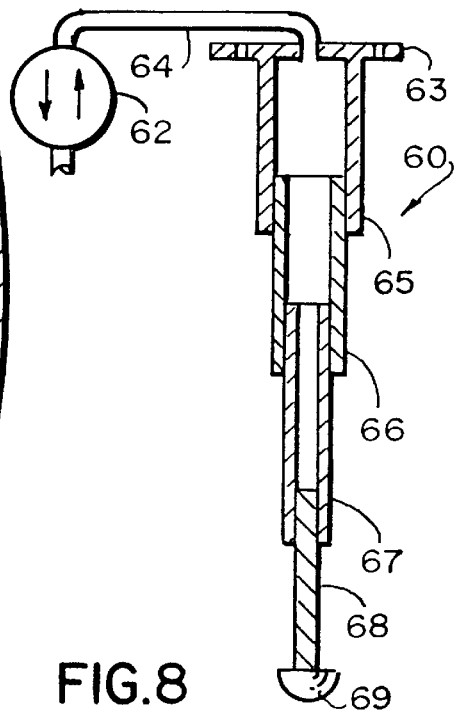
FIG. 8 is a detailed view of a landing "stilt" of the PAT of FIG. 1.

FIG. 8 shows a telescoping landing stilt 60 which is preferably attached to, and extends downward from the outer annular platform 14. The landing stilt is pneumatically operated by an air pump 62, that is capable of pumping air in either of two directions. This air is conveyed to or from the landing stilt 60 via a tube 64 connected to the attachment bracket 63. When air is pumped in, the telescoping elements 65, 66, 67 and 68 extend downward and provide a pneumatic spring and shock absorber for landing. When air is pumped out of the system the telescoping elements retract. A small pad or "foot" 69 ensures that the landing stilt secures a firm footing on the ground.

Figure 9:
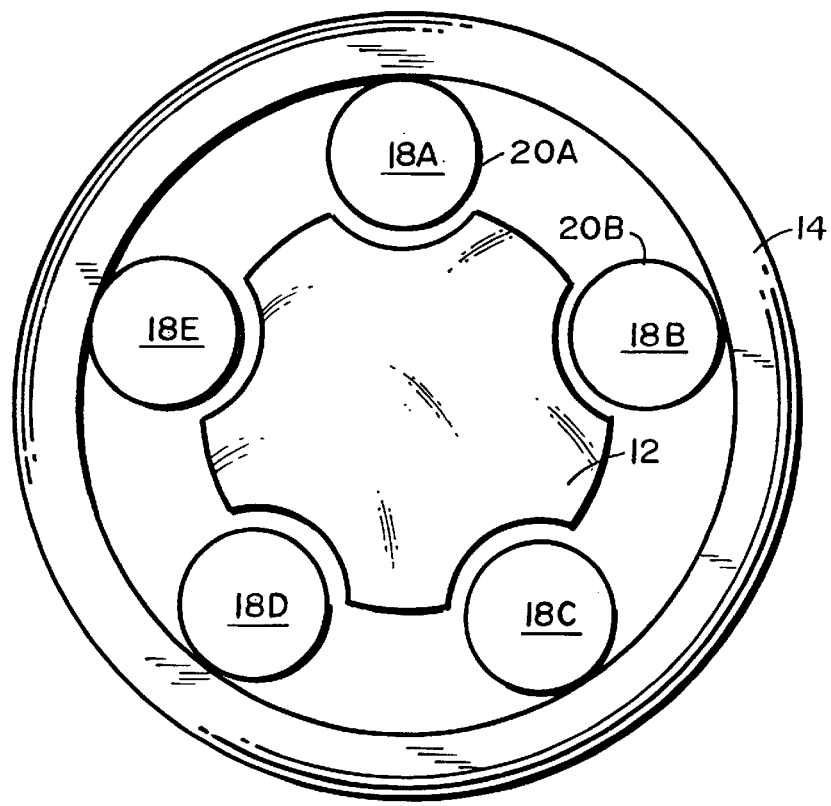
FIG. 9 is a diagram of a PAT showing the minimum number of engines for fail-safe operation.

FIG. 9 illustrates the advantage of having at least five separate engines 18 on the PAT craft. Assuming that each engine drives at least one propeller 20, preferably mounted coaxially with the engine drive shaft, it may be seen that five engines 18A, 18B, 18C, 18D and 18E, spaced equidistantly around the inner platform 12 are the minimum number required for fail-safe operation. If one of these engines fails, the remaining four will be able to lift and support the craft without causing it to flip over.

If two engines fail, and if they are not adjacent each other, the craft will also continue to fly or, if there is insufficient lift, to at least hover or descend slowly while maintaining a level platform.

FIG. 9 shows only five propellers 20A, 20B, etc., one for each engine. It would, of course, also be possible for each engine to drive two or more propellers about a common axis or even about multiple axes by providing a suitable mechanical linkage. For example, five engines arranged equidistantly as shown in FIG. 7 could drive a total of ten propellers arranged in a circle in the manner shown in FIG. 3.

Figure 10:
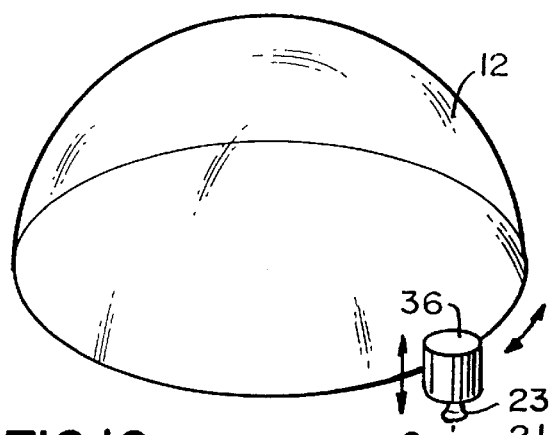
FIG. 10 is a detailed view of the starter mechanism of the PAT of FIG. 1.

FIG. 10 illustrates how the engines 18 may be started using an electric starter motor 36. This starting motor has a chuck 23 which engages the spinner hub 21 of each engine 18. The starter motor 36 is arranged on a ring or a track that surrounds the inner platform 12 and is caused to move around the platform 12 stopping at each engine, in turn, to start it.

If an engine fails in flight, the starter may be incremented to this engine and lowered onto the engine for starting.

Figure 12:
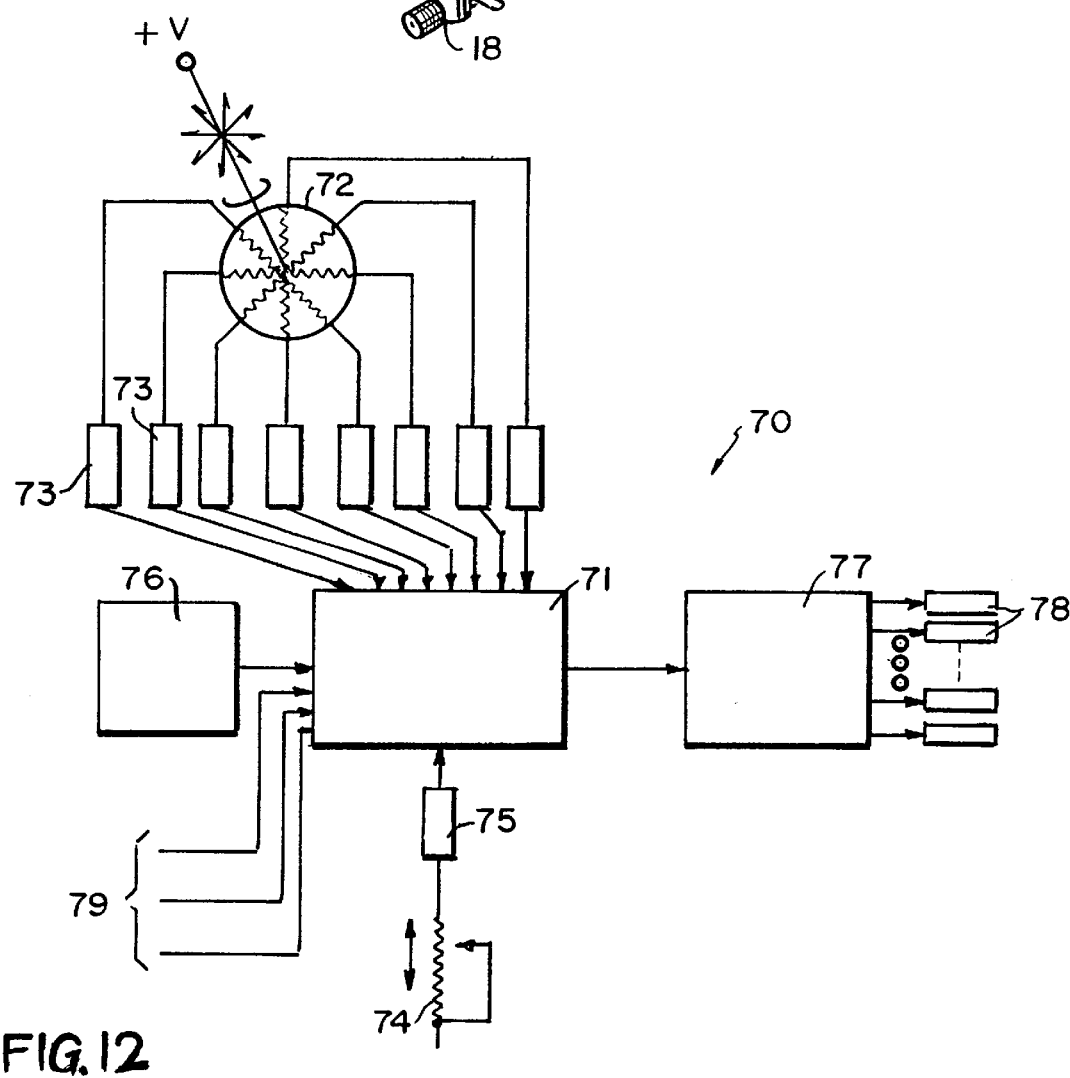
FIG. 12 is a diagram of the electronic circuit for actuating the throttle servos of the engines.

FIG. 12 is a block diagram of the electronic circuit 70 used to control the thirteen servos that operate the throttles of the thirteen engines. The joystick 24 selectively varies the resistance of a star-shaped array of resistors 72 which receive a constant voltage V at this center point. The output voltages of the various resistors are converted to digital numbers in a series of analog-to-digital converters 73.

Similarly, the throttle lever 26 adjusts the resistance of a single variable resistor 74 causing the input voltage V to vary. The output voltage is then converted to a digital number by an analog-to-digital converter 75.

The outputs of the A/D converters 73 and 75 are read by a microcomputer 71 which also receives a vertical reference signal from a gyroscopic device 76. The gyroscopic device maintains a stable horizontal platform and outputs a reference signal indicating the angular deviation of the PAT craft from the horizontal. Stated another way, the device 76 continuously informs the microcomputer which way vertically "down".

Other inputs 79 to the microcomputer 71 may comprise GPS generated information defining the craft's position on the globe (latitude and longitude); altimeter generated information regarding the craft's altitude above sea level and above ground; and compass generated information as to the direction of true north.

The microcomputer calculates the throttle values required to orient the craft in the manner selected by the joystick 24 and the throttle lever 26. In so doing, the microcomputer insures that the craft will not be tilted so far in any direction, for example more than 30° from the horizontal, as to dangerously reduce the lift or tumble over.

The throttle values determined by the microcomputer are passed, either sequentially or in parallel to a demultiplexer and translator 77, which produces pulse code modulated (PCM) signals for the thirteen throttle servos 78.

Figure 13:
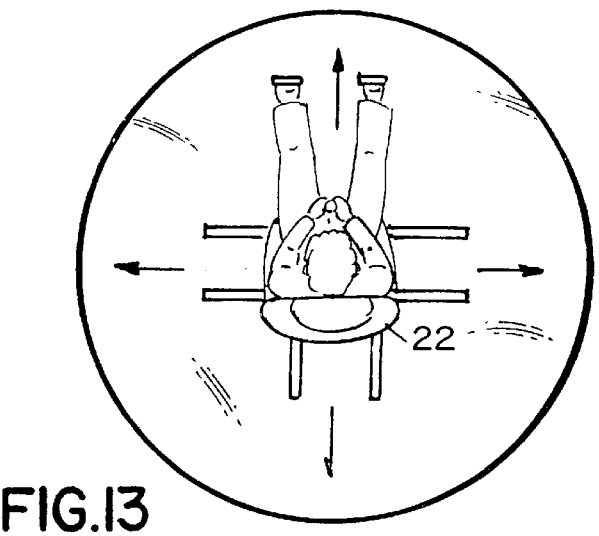
FIG. 13 is a top view of a portion of the PAT showing an alternative embodiment for balancing and steering the craft according to the invention.
Figure 14:
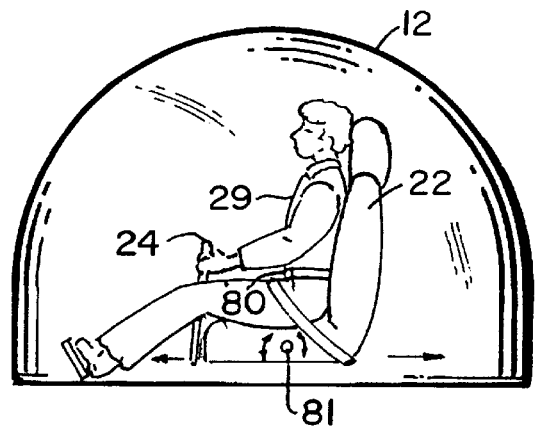
FIG. 14 is a side view of the cockpit portion of the PAT shown in FIG. 13.

FIGS. 13 and 14 illustrate how the PAT craft may be controlled by shifting the weight of the passenger(s). As is best seen in FIG. 13, the passenger seat may be moved in the horizontal direction, either forward or back, to the right or to the left, or a combination of these movements, to change the position of the center of gravity of the craft.

Normally, the center of gravity or CG of a seated person is located approximately at the position of the person's navel, or at the point where the seat belt passes across the person's torso. If this CG point is moved horizontally from a central position on the craft, the craft will tilt. This tilting may be used, either in addition to, or instead of the individual engine throttle control described above, to maneuver the craft horizontally.

FIG. 14 shows the position of the CG 80 at substantially the center of the craft. FIG. 14 also shows a pivot point 81 either through the bottom of, or beneath the seat 22 about which the passenger 29 may be tipped forward or backward. In this way, the passenger can remain substantially level even though the craft is tilted sharply forward when traveling in the forward direction.

Figure 15:
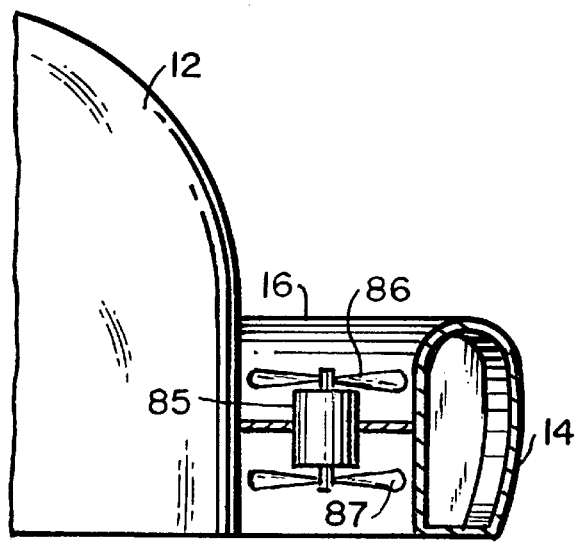
FIG. 15 is a detailed diagram showing a particular design of a thruster for the PAT of FIG. 1.

FIG. 15 shows an alternative embodiment of a circular thruster for the personal air transport. In this case, the thruster comprises an engine 85 mounted within the annular region 16 between the inner platform 12 and the outer platform 14. The engine 85 rotates two propellers 86 and 87 either in the same direction or, preferably, in opposite rotational directions. The propellers are preferably multi-blade propellers for increased efficiency, as illustrated, in top view, in FIG. 16.

The engine drives the propellers at speeds up to 7500 RPM or 125 revolutions per second. Such propellers may have a maximum diameter of about 21 inches to maintain the tip speed below about 0.7 times the speed of sound or 700 feet per second.

The maximum tip speed at 125 revolutions per second is: 700/125=5.6 feet (circumference)

The diameter is therefore $5.6/\pi=1.78$ feet×12=21.36 in.

With a six inch or ½ foot pitch, the blades operating at 125 revolutions/second can move air at 62.5 feet per second.

FIG. 17 illustrates and engine 90 which drives counter rotating shafts 91 and 92. The engine comprises a first prime mover 94, a second prime mover 95 and a central mechanism 96 which couples the two shafts 91 and 92 for counter rotation. This mechanism 96 is illustrated in FIGS. 18 and 19. As illustrated there, the shafts 91 and 92 are both coupled mechanically to a separate shaft 98. The shaft 91 is mechanically coupled to the shaft 98 via gears 100 and 101 which cause the shaft 98 to rotate in a direction opposite to that of the shaft 91. In contrast, the shaft 92 is coupled to the shaft 98 via a pulley or chain 102, causing the shaft 98 to rotate in the same direction as the shaft 92. The pulley 102 surrounds two pulley wheels 104 and 105 of identical diameter.

Since the gear ratio of the gears 100 and 101 is 1:1 and the pulley operates with a ratio of 1:1, the shafts 91 and 92 rotate at the same speed, but in opposite directions.

The prime movers 94 and 95 in FIG. 17 are preferably internal combustion engines such as reciprocating piston engines or Wankel engines. In the former case, the cylinders 106 and 107 may be arranged in opposed relationship, as illustrated in FIG. 20, so that the pistons 108 and 109, respectively, will move in exactly opposite directions, thus reducing engine vibration due to imbalance of the reciprocating parts.

Figure 21:
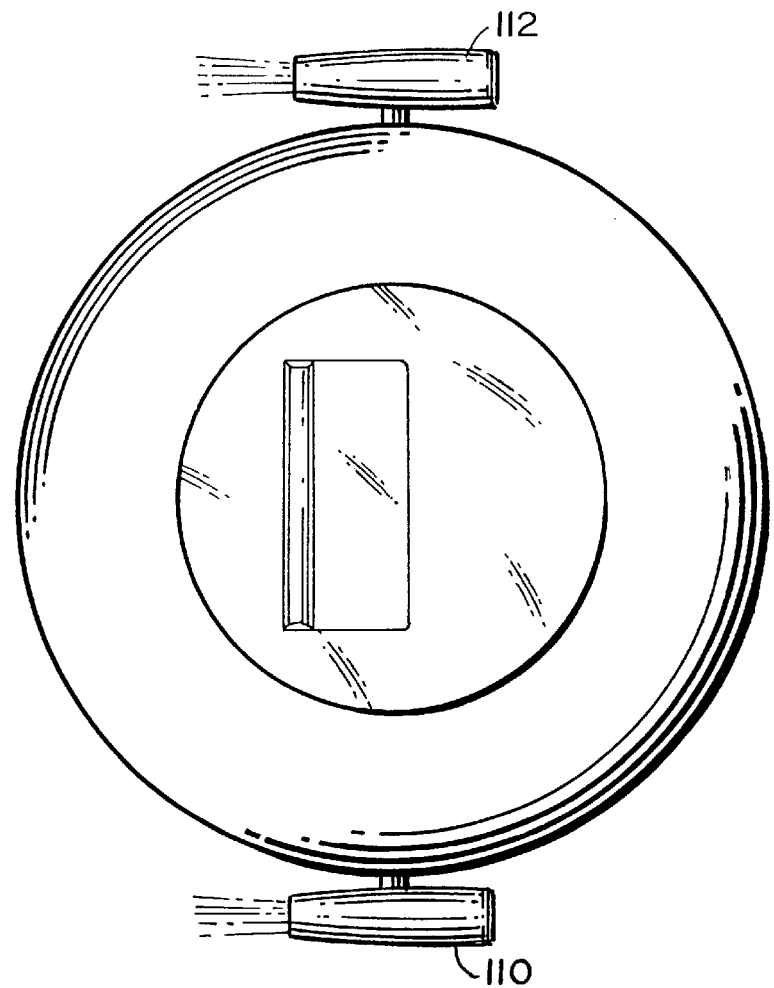
FIG. 21 is a top view of a PAT according to the invention having two external thrusters.
Figure 22:
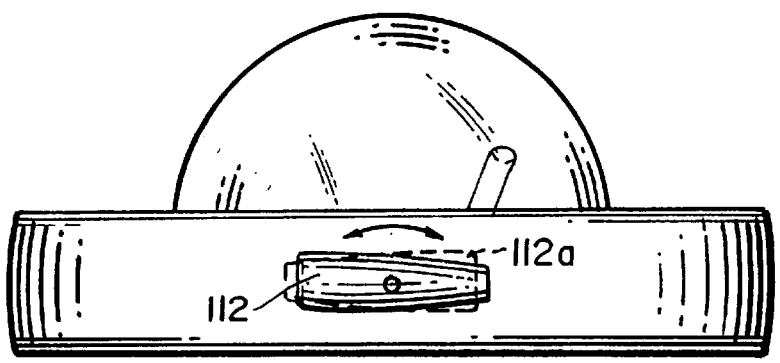
FIG. 22 is a side view of a PAT having external thrusters as shown in FIG. 21.

FIGS. 21 and 22 illustrate the addition of small thrusters 110 and 112 on opposite sides of the personal air transport. These thrusters, which may be small jet engines, rocket motors or shrouded motor driven propellers or fans, operate to speed the craft in the forward direction and, upon reversal of thrust by rotating the engines to the position shown in dashed lines 112a, the thrusters serve to rapidly break the forward motion of the vehicle in mid-air.

Figure 23:
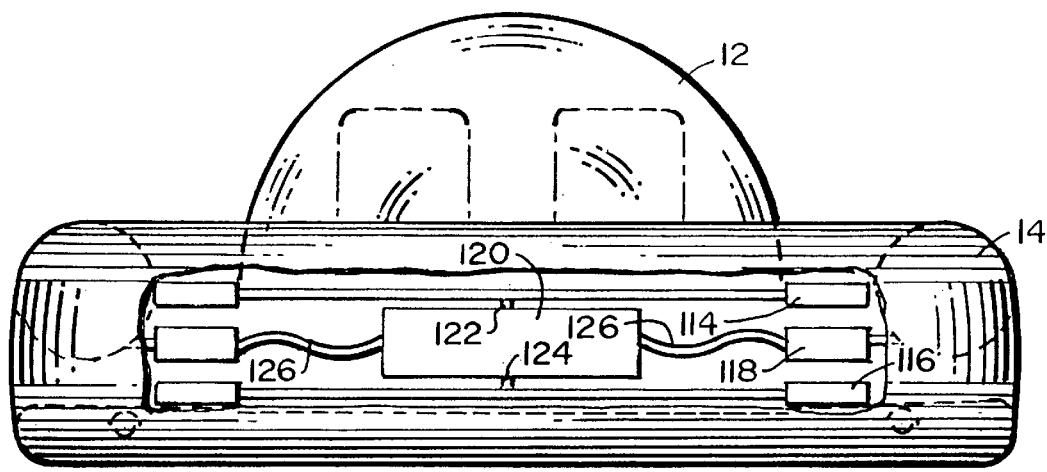
FIG. 23 is a side elevational view of a PAT having two counter-rotating propeller blades.
Figure 24:
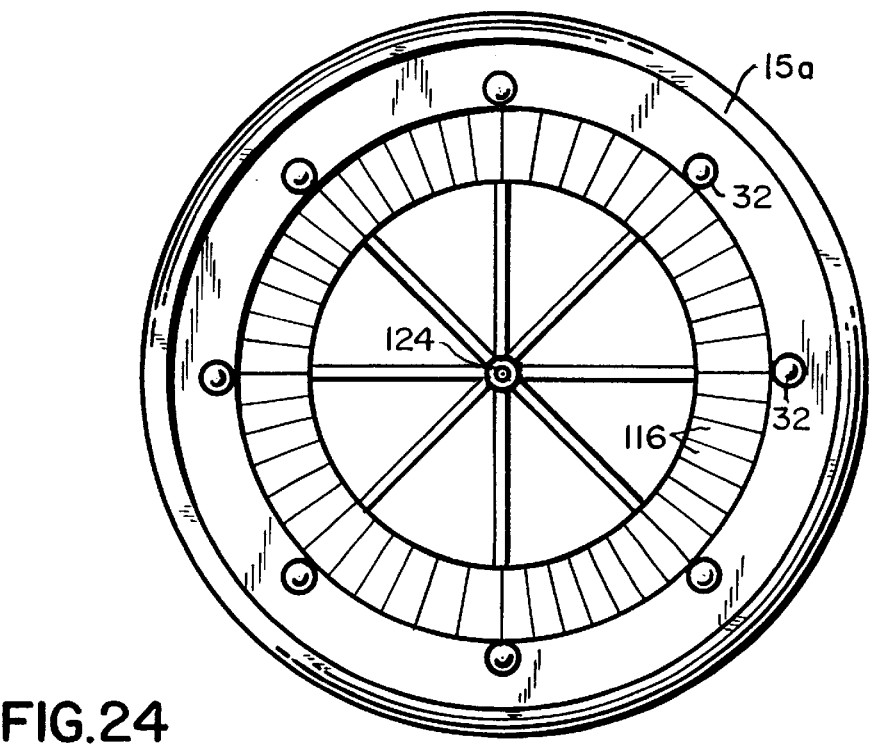
FIG. 24 is a bottom view of the PAT of FIG. 23 showing one of the propeller blades.

FIGS. 23 and 24 illustrate an alternative embodiment whereby two large fans are driven about a central vertical axis of the craft. A first fan 114 operates (rotates) in one direction while a second fan 116 rotates in the opposite direction. Fixed blades 118 redirect the air as it is forced downward at an angle by the blades 114.

The engine 120 preferably comprises two separate engines and a central mechanism, as are shown in FIG. 17, for counter rotating the fan blades 114 and 116 about the central shafts 122 and 124, respectively.

The engines 120 receive fuel from the fuel tanks in the outer platform 14 via tubes 126. These tubes also serve to transport liquid coolant from small radiators (not shown) within the airstream generated by the fans 114 and 116.

Figure 25:
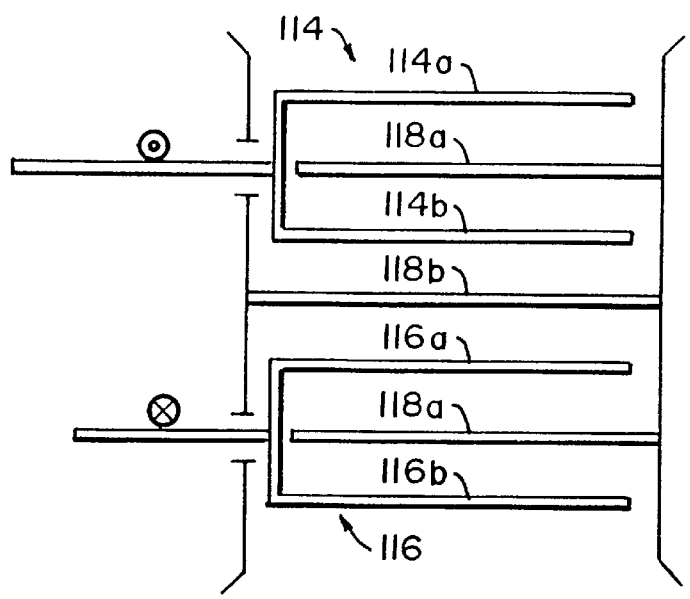
FIG. 25 is a representational diagram showing an alternative embodiment of the blade configuration for the PAT of FIG. 23.

FIG. 25 illustrates an alternative embodiment whereby the fans 114 and 116 may be composed of successive fan blades 114a and 114b, 116a and 116b, respectively. In between the rotating blades 114 and 116 are a series of fixed blades 118a, 118b and 118c. These blades are designed to provide the maximum upward thrust available in a configuration of this type.

Figure 26:
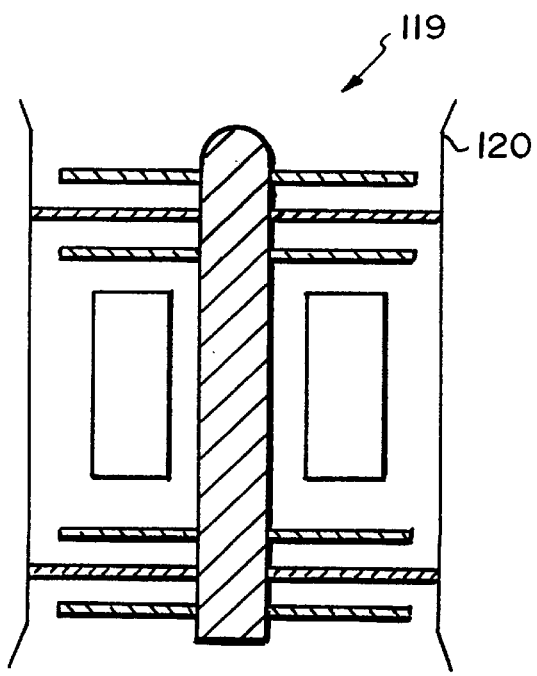
FIG. 26 is a representational diagram of a jet engine arranged in the space between the inner and outer platforms.
Figure 27:
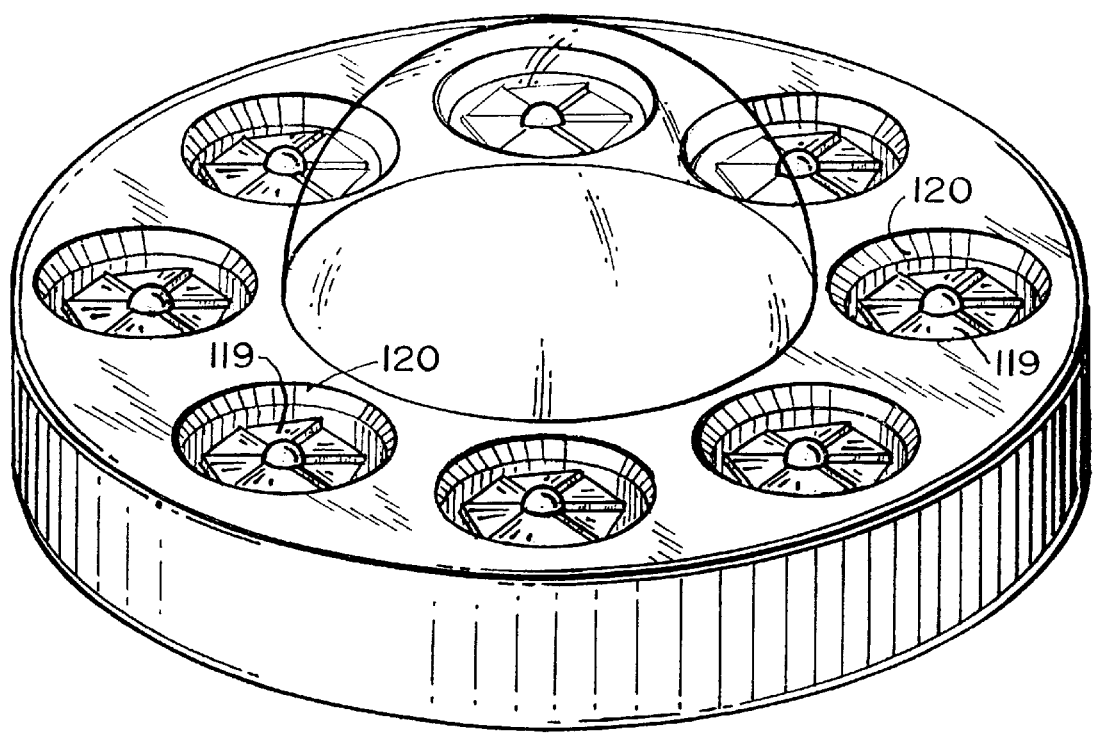
FIG. 27 is a perspective view of the PAT according to a preferred embodiment of the present invention which incorporates jet engines.

In still another modification of the present invention, individual thrusters in the form of jet engines may be provided, as illustrated in FIG. 26, with each engine in its own separate cylindrical channel 120 as illustrated in FIG. 27. FIG. 27 shows the personal air transport having eight jet engines arranged in eight such channels.

Alternatively, thrusters of the type illustrated in FIG. 2 or in FIG. 15 can be disposed in individual, cylindrical channels.

There has thus been shown and described a novel personal air transport (PAT) which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A wingless, personal air transport (PAT) comprising, in combination:
   (a) a substantially horizontal circular inner platform with its outer extremity having a first diameter D1, said inner platform having a seat for carrying at least one person and having a shroud forming a smooth upper surface extending outward and downward to said outer extremity; and
   (b) a plurality N of independently powered thrusters distributed around a circle substantially equidistant from each other, each of said thrusters being attached to said inner platform, outside of said outer extremity, and arranged to produce upward thrust in a substantially vertical axis, wherein $N \geq 5$.

2. The PAT defined in claim 1, wherein $N \geq 10$.

3. The PAT defined in claim 1, further comprising a substantially horizontal annular outer platform arranged coaxially with said inner platform, said outer platform having a central opening with a second diameter D2 and having a shroud forming a substantially smooth upper surface extending inward and downward into said central opening;
   said second diameter D2 being greater than said first diameter D1 and forming a space between said inner and outer platforms;
   wherein said thrusters are arranged in said space.

4. The PAT defined in claim 3, wherein each of said plurality N of thrusters includes at least one internal combustion (IC) engine, each of said engines producing thrust by means of at least one propeller disposed in said space.

5. The PAT defined in claim 3, further comprising an exhaust muffler system arranged in said outer platform for receiving and muffling the exhaust gases of all thrusters.

6. The PAT defined in claim 3, further comprising a dust skirt arranged around the bottom of said outer platform for preventing air from escaping outward when said PAT is near the ground.

7. The PAT defined in claim 3, wherein at least one fuel tank is provided in said outer platform.

8. The PAT defined in claim 1, wherein at least one rotator flap is provided in the airstream provided by a thruster for rotating said craft about its central vertical axis.

9. The PAT defined in claim 1, wherein said thrusters have throttles, and individual servos are provided for each thruster to control its respective throttle.

10. The PAT defined in claim 9, further comprising a computer coupled to said servos, said computer adjusting the throttles of said thrusters to maintain said circular platform approximately level, notwithstanding the failure of one or more thrusters.

11. The PAT defined in claim 1, further comprising a plurality of telescoping stilts disposed on the bottom of the craft for absorbing landing shock.

12. The PAT defined in claim 1, wherein each of said thrusters includes an internal combustion, reciprocating engine.

13. The PAT defined in claim 1, wherein each of said thrusters includes an internal combustion, Wankel engine.

14. The PAT defined in claim 1, wherein each of said thrusters includes a jet engine.

15. The PAT defined in claim 1, wherein the center of gravity of the craft, with passengers aboard, is below the level of said upward thrust.

16. In a wingless, personal air transport (PAT) comprising, in combination:
   (a) a substantially horizontal circular inner platform with its outer extremity having a first diameter D1, said inner platform having a seat for carrying at least one person and having a shroud forming a smooth upper surface extending outward and downward to said outer extremity;
   (b) a substantially horizontal annular outer platform arranged coaxially with, and surrounding said inner platform, said outer platform having a central opening with a second diameter D2 and having a shroud forming a substantially smooth upper surface extending inward and downward into said central opening;
   said second diameter D2 being greater than said first diameter D1;
   (c) thruster means arranged in the space between said inner and outer platforms for forcing air downward; and
   (d) an enclosure disposed on said inner platform for protecting the passengers of the craft and providing a smooth surface for the flow of air to the space between the inner and outer platforms.

17. The PAT defined in claim 16, further comprising a dust skirt arranged around the bottom of said outer platform for preventing air from escaping outward when said PAT is near the ground.

18. The PAT defined in claim 16, wherein at least one engine fuel tank is provided in said outer platform.

19. The PAT defined in claim 16, wherein at least one rotator flap is provided in the airstream between said inner and outer platforms for rotating said craft about its central vertical axis.

20. The PAT defined in claim 16, wherein the center of gravity of the craft, with passengers aboard, is below the level of said means for forcing air downward.

21. The PAT defined in claim 16, further comprising a plurality of telescoping stilts disposed on the bottom of the craft for absorbing landing shock.

22. The PAT defined in claim 16, wherein said thruster means for forcing air downward include at least one engine driving coaxial, counter-rotating shafts and propeller blades, mounted for rotation about said shafts.

23. The PAT defined in claim 22, comprising a plurality of said engines arranged in, and equally distributed around said space between said inner and outer platforms.

24. The PAT defined in claim 23, comprising at least five of said thrusters arranged in, and equally distributed around said space between said inner and outer platforms.

25. The PAT defined in claim 16, wherein said thruster means for forcing air downward comprises an engine centrally arranged on said inner platform, and fan blades, driven by said engine, disposed in the space between said inner and outer platforms and rotating about a central vertical axis of said craft.

26. The PAT defined in claim 25, wherein said engine drives counter-rotating shafts and wherein said fan blades comprise two coaxial fans, each driven by one of said counter-rotating shafts, disposed in the space between said inner and outer platforms.

27. The PAT defined in claim 26, wherein said engine includes a prime mover comprising, in combination:
   (a) a first internal combustion engine having a first drive shaft extending therethrough;
   (b) a second internal combustion engine having a second drive shaft extending therethrough, said first and second shafts being arranged on a common axis and said second engine being capable of producing substantially equal power to that of said first engine; and
   (c) a transmission arranged intermediate said first and second engines and connecting said first and second shafts, said transmission requiring that said first and second shafts rotate in opposite directions,
   whereby said first and second engines operate in synchronism with their respective drive shafts rotating in opposite directions.

28. The PAT defined in claim 27, wherein said transmission requires that said first and second shafts rotate in opposite directions at the same speed.

29. The PAT defined in claim 26, wherein said fan blades further comprise stationary fan blades disposed in the space between said inner and outer platforms.

30. The PAT defined in claim 16, wherein said thruster means for forcing air downward comprises a plurality of thrusters arranged in, and equally distributed around the space between said inner and outer platforms.

31. The PAT defined in claim 30, wherein said thruster means for forcing air downward comprises at least five of thrusters arranged in, and equally distributed around the space between said inner and outer platforms.

32. The PAT defined in claim 16, wherein each of said thrusters includes an internal combustion, reciprocating engine.

33. The PAT defined in claim 16, wherein each of said thrusters includes an internal combustion, Wankel engine.

34. The PAT defined in claim 16, wherein each of said thrusters includes a jet engine.

35. The PAT defined in claim 16, wherein said enclosure is hemispherical.

36. A prime mover comprising, in combination:
   (a) a first internal combustion engine having a first drive shaft extending therethrough;
   (b) a second internal combustion engine having a second drive shaft extending therethrough, said first and second shafts being arranged on a common axis and said second engine being capable of producing substantially equal power to that of said first engine; and
   (c) a transmission arranged intermediate said first and second engines and connecting said first and second shafts, said transmission requiring that said first and second shafts rotate in opposite directions,
   whereby said first and second engines operate in synchronism with their respective drive shafts rotating in opposite directions.

37. The prime mover defined in claim 36, wherein said transmission requires that said first and second shafts rotate in opposite directions at the same speed.

* * * * *